INVENTOR
NILS OLOV JOHANSSON
BY Hane and Nydick
ATTORNEYS

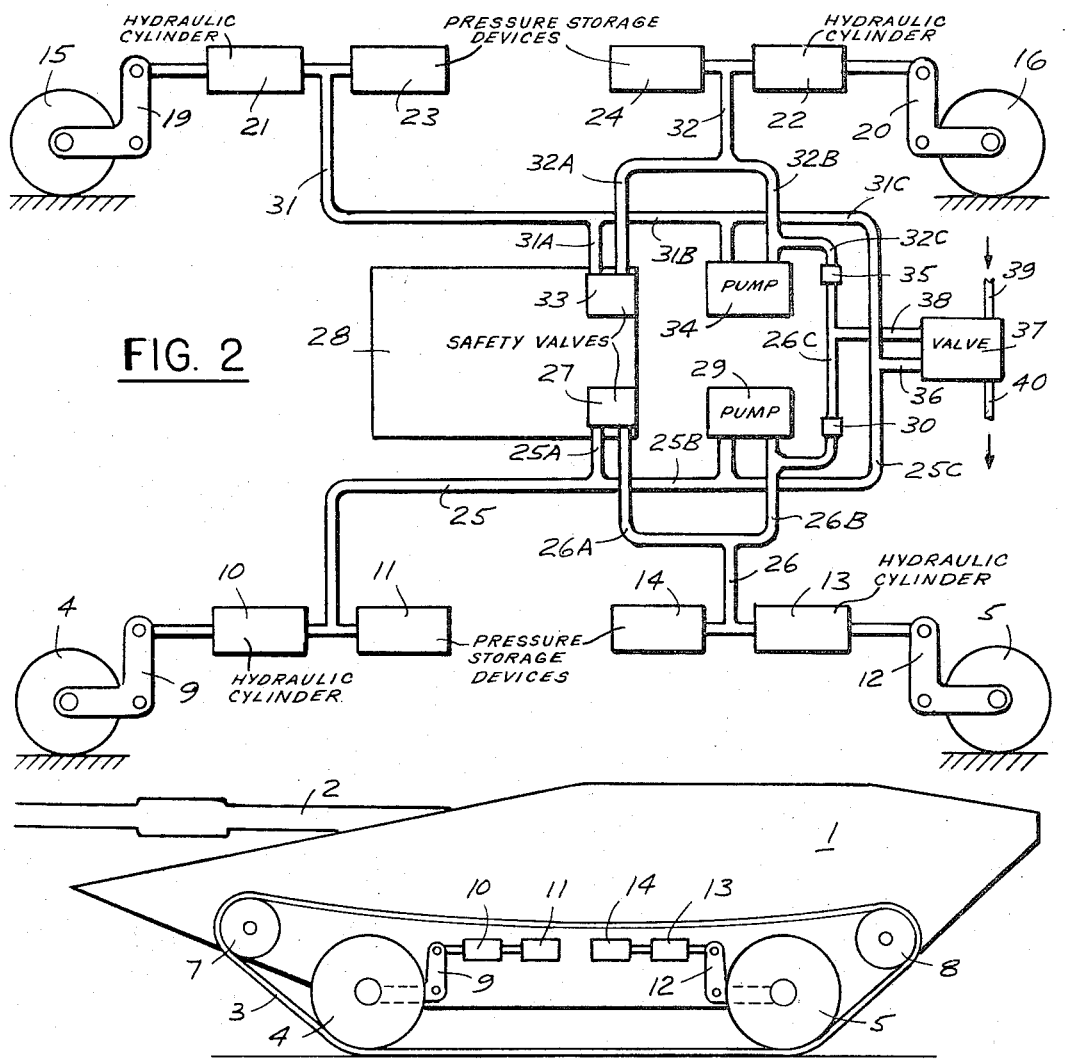
FIG. 2
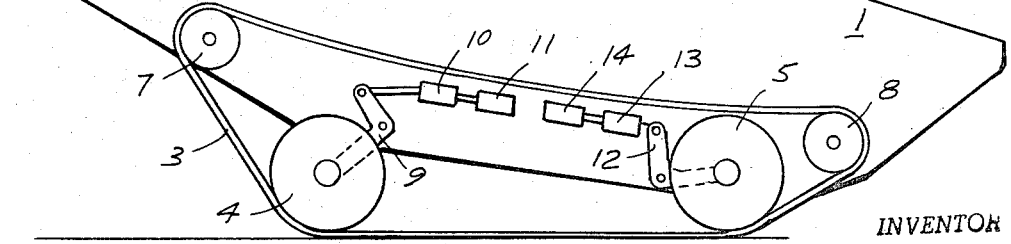
FIG. 3
FIG. 4
INVENTOR
NILS OLOV JOHANSSON

United States Patent Office 3,343,619
Patented Sept. 26, 1967

3,343,619
DEVICE FOR REGULATING THE POSITION OF A TRACK-LAYING VEHICLE IN RELATION TO THE GROUND
Nils Olov Johansson, Karlskoga, Sweden, assignor to Aktiebolaget Bofors, Bofors, Sweden, a corporation of Sweden
Filed Oct. 21, 1965, Ser. No. 499,190
Claims priority, application Sweden, Nov. 27, 1964, 14,318/64
9 Claims. (Cl. 180—9.2)

ABSTRACT OF THE DISCLOSURE

An adjustable suspension device for adjusting the position of the front wheels and the rear wheels of a track-laying vehicle such as a combat vehicle. The device permits independent adjustment of the positions of the wheels in reference to the body of the vehicle and thus also in reference to the ground for the purpose of aiming the gun or other weapon mounted on the vehicle in fixed position.

---

Figure 1:
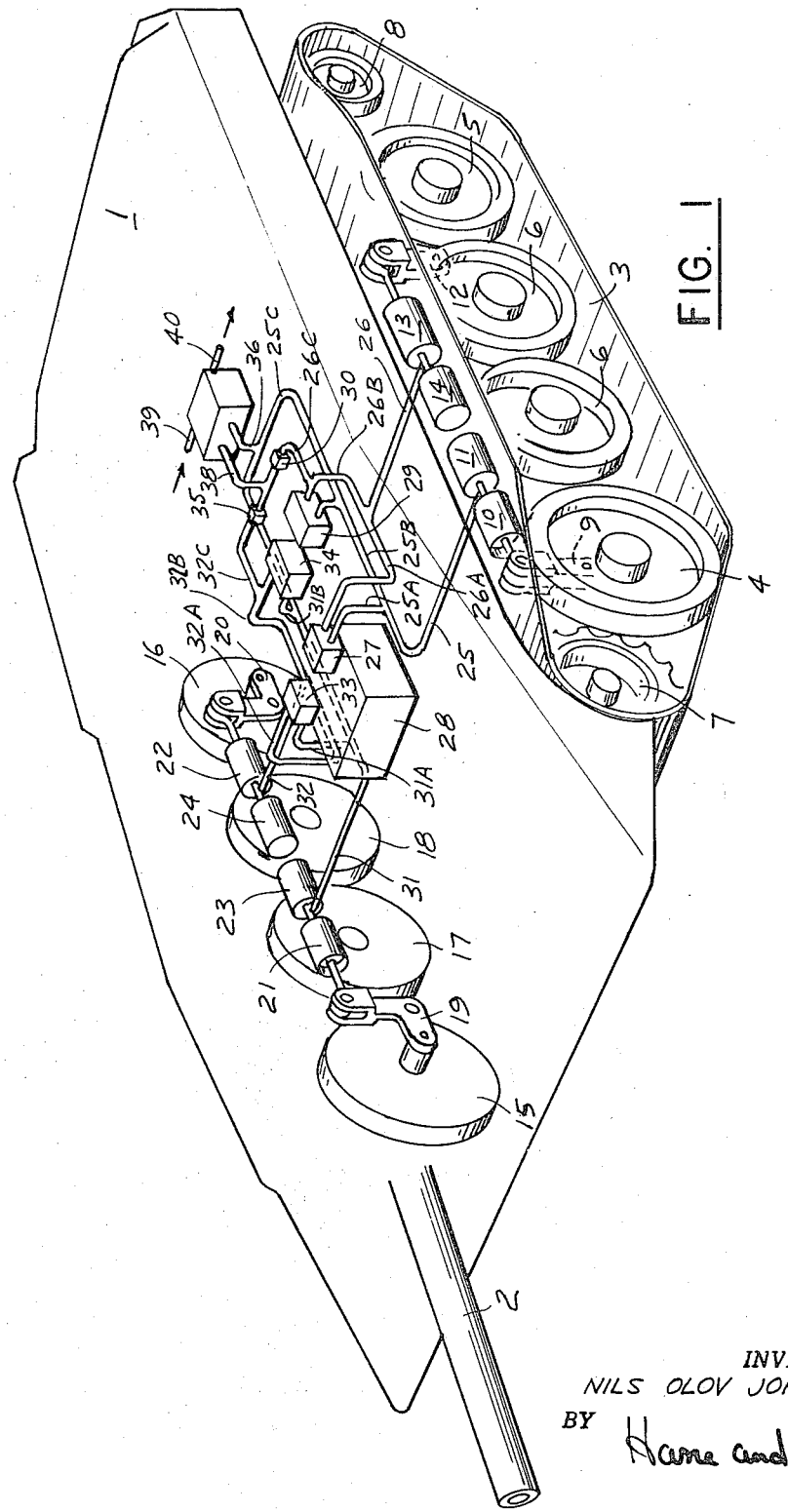

The present invention relates to a device for regulating the position of a track-laying vehicle in relation to the ground, and particularly the position of a vehicle which has at its four corners track-laying wheels rotatably arranged in the travelling direction of the vehicle and each connected to the chassis of the vehicle by a yieldable suspension device consisting of a hydraulic cylinder with a piston, to which a pressure storage device is connected. The invention is particularly well suited for track-laying combat vehicles which travel at high speeds, especially those on which the primary armament consists of a weapon in fixed mounting in the vehicle. With vehicles of the last-mentioned type it is desirable to be able to travel rapidly and comparatively smoothly even in rough terrain, and to be able to aim the weapon accurately, within the shortest possible time. When a gun in fixed mounting in a track-laying vehicle is elevated and depressed, the tracks will be subjected to quite considerable stretching and slackening, which must be compensated in order to obtain satisfactory tensioning of the driving tracks.

For track-laying combat vehicles which travel at high speeds, in which the primary armament has fixed mounting in the vehicle, it is necessary to be able to regulate the position of the vehicle, in relation to the ground, in order to provide for elevating or depressing of the weapon. At the same time, the vehicle should be equipped with yieldable suspension devices, in order to provide for more or less smooth riding even in rough terrain, and the vehicle should also be capable of withstanding sudden heavy shocks, particularly on the front road wheels, without causing damages to the yieldable suspension devices owing to excessive stresses, but still without the need for providing over-dimensioned suspension devices with consideration to the requirements at normal stresses.

The present invention has made it possible to achieve a track-laying vehicle with the properties described above. A track-laying vehicle equipped with a device according to the present invention can thus achieve rapid and accurate elevation and depression of a weapon fixedly mounted on the vehicle, and at the same time afford comparatively smooth riding even in fairly rough terrain but can, finally, nevertheless withstand sudden shocks on the end road wheels, without any major delay in the travel of the vehicle or the aiming of the gun. Further, the device according to the present invention makes it possible to compensate for the stretching or slackening of the tracks which occurs when the gun is elevated and depressed.

A device for regulating the position of a track-laying vehicle in relation to the ground, in which the four corner wheels of the vehicle are rotatably arranged in the travelling direction of the vehicle and are each connected with a yieldable suspension device consisting of a hydraulic cylinder with a piston to which a pressure storage device is connected, is characterized according to the present invention in that two hydraulic cylinders arranged on each side of the wheels of the vehicle are each connected to the input and output pipes of a reversible pump with a variable displacement. The hydraulic cylinders for the two front end wheels can appropriately have open connections to each other. The four hydraulic cylinders can moreover each be connected to a non-return valve in one or several safety valve devices. The pipes to the hydraulic cylinders of the end road wheels can appropriately be connected to a valve which can regulate the feed and outlet of hydraulic fluid. The hydraulic cylinders for the two front wheels can appropriately have a common connection to the valve which regulates the feed and outlet of the hydraulic fluid, and the hydraulic cylinders for the two rear wheels are each connected through a branch pipe with another connection to said valve, and in these branch pipes, non-return valves have been arranged, which only permit the feed of hydraulic fluid. From a common input for hydraulic fluid in the valve, two branches can lead to the connection for the cylinders for the front wheels and to the connection for the hydraulic cylinders for the two rear wheels, and these branches can be opened or closed simultaneously by a valve plunger which can be regulated. It can also be possible to set the connection to the hydraulic cylinders for the two front wheels in connection with an outlet for hydraulic fluid. Finally, the branch to the connection for the hydraulic cylinders for the two front wheels in front of the valve plunger which can be regulated, can be provided with a non-return valve which only permits the feed of hydraulic fluid.

Figure 5:
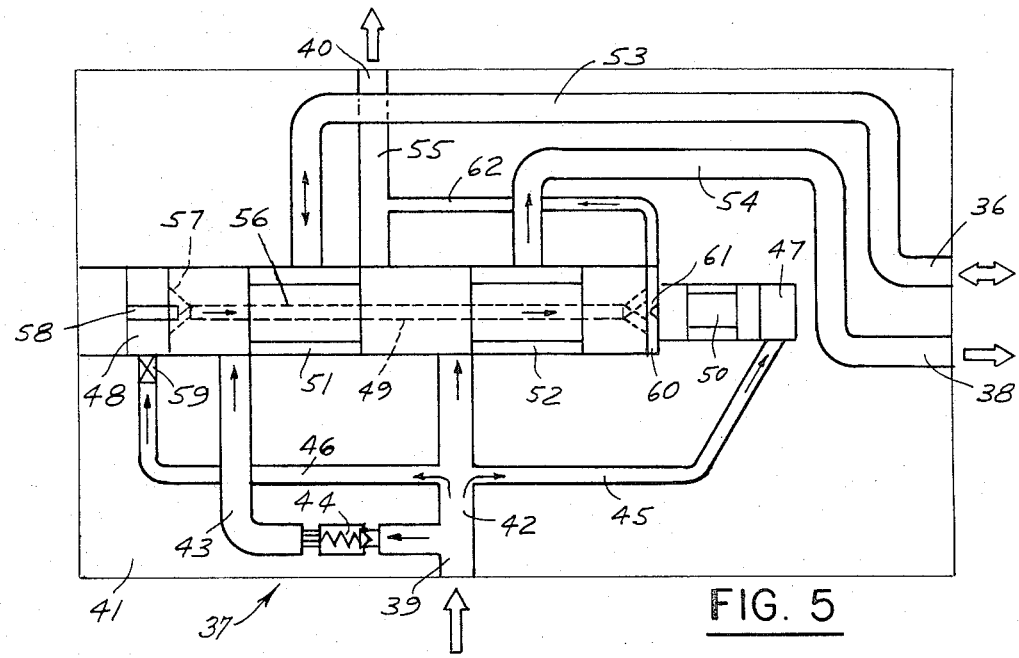

The invention will now be described in more detail with reference to an embodiment of the invention shown in the attached drawings. FIG. 1 shows schematically and in perspective a track-laying combat vehicle with a fixedly mounted gun, on which vehicle a device according to the present invention has been used. FIG. 2 shows a schematic diagram of the device according to FIG. 1. FIGS. 3 and 4 show a schematic side view of the track-laying vehicle according to FIG. 1, and with the gun in fixed mounting in two different positions. In FIG. 5, the function of a valve comprised in the device is shown schematically, and FIG. 6, finally, shows the structure of said valve in perspective and partly cut open.

The track-laying vehicle 1 shown in FIG. 1 is provided with a fixedly mounted gun the barrel 2 of which is indicated in the figure. One track 3 of the vehicle is guided over two end wheels 4 and 5 and over two intermediate wheels 6, a drive sprocket 7 and an idler 8. The end wheel 4 is rotatably arranged in the longitudinal direction of the vehicle via a pivotal crank arm 9. The arm 9 is connected via a rod to a piston arranged so that it can be displaced in a hydraulic cylinder 10. This hydraulic cylinder 10 is connected with a pressure storage device 11 by means of a pipe. The cylinder and its piston constitute a servo-unit.

In a similar way, the end wheel 5 is rotatable suspended by means of a pivotal crank arm 12, which via a rod is connected with a piston which can be displaced in a hydraulic cylinder 13. This hydraulic cylinder 13 is connected with a pressure storage device 14 by means of a pipe.

The above-mentioned elements refer to one side of the vehicle, and on its other side, in a corresponding way, end wheels 15 and 16, intermediate wheels 17 and 18, pivotal crank arms 19 and 20, hydraulic cylinders 21 and 22, and pressure storage devices 23 and 24 are arranged to guide the second track of the vehicle.

From the pipes between the hydraulic cylinders 10 and 13 and the pressure storage devices 11 and 14, respectively, extend connections 25 and 26, with branches which through pipes 25A and 26A lead to a safety valve 27 mounted on and connected to a tank 28 containing pressure fluid such as oil. An appropriate structure of the safety valve 27 is described in patent application Ser. No. 496,623 filed Oct. 15, 1965. From the pipes 25 and 26 extend also branch pipes 25B and 26B which lead to a pump 29. This pump is to be reversible and have a variable displacement, and can, for instance, consist of a conventional axial piston pump, in which the length of stroke is determined by the position of the tilting box of the pump. From the branch pipes 25B and 26B extend further branch pipes 25C and 26C. A non-return valve 30 is placed in the pipe 26C, which permits flow in the direction towards the branch pipe 26B but not in the opposite direction.

In the same way as described above, pipes 31 and 32 extend from the connections between the hydraulic cylinder 21 and pressure storage device 23, and from the connection between the hydraulic cylinder 22 and pressure storage device 24, respectively, and these pipes 31 and 32 are provided with branch pipes 31A and 32A leading to a safety valve 33 mounted on and connected to the tank 28. Branch pipes 31B and 32B lead to a pump 34 and, finally, branch pipes 31C and 32C, the branch pipe 32C including a non-return valve 35.

The branch pipes 25C and 31C are joined via a connection 36 to a valve 37. The valve 37 also has a connection 38 to which the branch pipes 26C and 32C lead. Hydraulic pressure fluid from a hydraulic system (not shown) belonging to the device can be fed to the valve 37 via a pipe 39 and can be let out through a pipe 40.

The schematic construction of the valve 37 is shown in FIG. 5. The inlet 39 for the hydraulic fluid branches inside a valve housing 41, into two pipes 42 and 43. In the pipe 43, a non-return valve 44 is placed in such a way that the hydraulic fluid can flow in through said pipe 43 but cannot go out through same. Hydraulic fluid can also be conducted away from the pipe 42 through the branch pipes 45 and 46, which lead to two chambers 47 and 48, which are part of a cylindrical chamber in which the valve plunger 49 and a back-pressure plunger 50 which acts against this plunger are arranged so that they can be displaced. The valve plunger 49 is provided with two recesses 51 and 52, which are placed in such a way in relation to the pipes 42 and 43 that these are kept closed when the valve plunger 49 is in its unactuated position. When the valve plunger 49 is displaced in the direction towards the chamber 48, a connection will be obtained between the pipes 42 and 43 and the chambers 51 and 52. The chambers 51 and 52 are connected via the pipes 53 and 54 to the connections 36 and 38 connected to the valve 37. The valve housing 41 also contains a connection 55, which is connected to the outlet side of the hydraulic system via the pipe 40. This connection 55 is placed in such a way that when the valve plunger 49 is displaced in the direction towards the chamber 47, the connection 55 to the chamber 51 will be open.

The valve plunger 49 is provided with a central, axial bore 56, which opens into a chamber in the form of a tapered recess 57, in which a valve needle 58 is arranged in such a way that it effects a variable throttling of the connection between the chamber 48 and the bore 56. Adjacent to the chamber 48 there is also a fixed throttle 59 arranged, which regulates the feed of hydraulic fluid through pipe 46.

At the end of the valve plunger 49 opposite the chamber 48, a chamber 60 is formed by the surface which bears against the back-pressure plunger 50. The plunger has on its side facing chamber 60 a pointed stud 61. The chamber 60 is connected by means of a pipe 62 to the connection 55, and thereby with the outlet pipe 40 of the hydraulic system.

Figure 6:
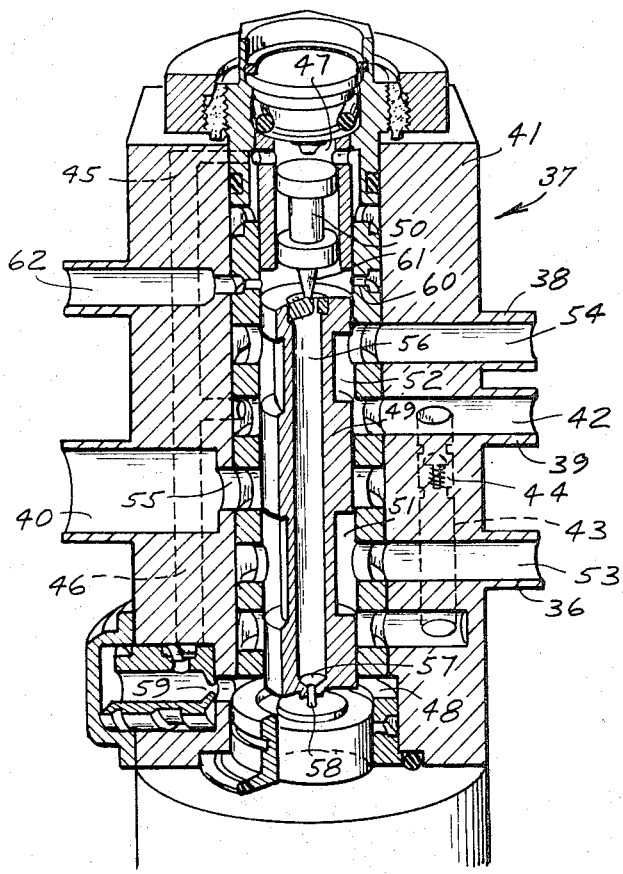

In FIG. 6, the structure of the valve 37 is shown, and the elements which are shown schematically in FIG. 5 have been given the corresponding reference designations in this figure. The operation of the valve is evident from the description of FIG. 5. FIG. 6 shows the valve 37 in such a position that the hydraulic fluid feed 39 is connected with the connections 36 and 38.

The device described above functions in the following way. In FIG. 3, the track-laying vehicle 1 is shown with the gun 2 in a horizontal position. FIG. 4 shows the barrel 2 elevated, and this has been effected by pumping hydraulic fluid from the cylinder 13 to the cylinder 10. The fluid has been pumped through the pipes 26, 26B, 25B and 25 by the pump 29. Due to such pumping, the piston which can be displaced in the cylinder 13 has been moved in the direction towards the pressure storage device 14, and the arm 12 has then swung the end wheel 5 in the direction towards the vehicle body. The feeding of hydraulic fluid to the cylinder 10 has had the result that the piston which can be displaced in said cylinder has been pressed in the direction away from the pressure storage device 11, whereby the end road wheel 4, with the co-operation of the arm 9, has been pressed in the direction away from the vehicle body. In a similar way, hydraulic fluid has been pumped by the pump 34 from the cylinder 22 to the cylinder 21, and the end wheel 16 has thereby come closer to the vehicle body and the end wheel 15 further away from it. As a final result, the barrel 2 will thereby be elevated, as shown in FIG. 4.

At the elevation of the barrel 2 shown in FIG. 4, however, the track 3 will be stretched too hard, if the displacement of the piston in the cylinder 13 is as great as the opposite displacement of the piston in the cylinder 10. In order to compensate for such excessive stretching, a certain quantity of hydraulic fluid is let out through the valve 37. In other cases, for instance, when the gun is layed towards the horizontal position, if the track should be too slack, hydraulic fluid must be fed in, and this can also be accomplished by means of the valve 37. Feeding and draining of hydraulic fluid can also be resorted to if it is desired to change the ground clearance of the vehicle, and hydraulic fluid must, moreover, be fed in if, in some case, owing to a very heavy shock, fluid is let out through either of the safety valves 27 and 33. The functioning of these safety valves is described in patent application Ser. No. 496,623, filed Oct. 15, 1965. Due to the open connection between the hydraulic cylinders 10 and 21 for the two front end wheels 4 and 15 via the pipes 25, 25B, 25C, 31C, 31B and 31, the shock stresses on either of the front end wheels will automatically be compensated by a corresponding pressure in the other end wheel, which to a high degree improves the smooth and even travelling of the track-laying vehicle, which is desired. There is no corresponding open connection between the hydraulic cylinders 13 and 22 of the rear end wheels, and this is because of the non-return valves 30 and 35 placed in the pipes 26C and 32C. However, such an equalizing between the two rear end wheels 5 and 16 is not as essential, since the major portion of the shock stresses normally affect the two front end wheels 4 and 15. However, equalizing in relation to the ground surface can be obtained also for the rear end wheels by the co-operation of the pumps 29 and 34.

The functioning of the valve 37 is best shown in FIG. 5. The hydraulic fluid fed under pressure to the valve 37 through the pipe 39 is distributed inside the valve housing 51 to the pipes 42, 43, 45 and 46. The hydraulic fluid, which is under pressure, is fed through pipe 46 and the throttle 59 to the chamber 48. Hydraulic fluid is fed to the chamber 47 through the pipe 45, and when a balance is obtained in the valve 37, the influence of the hydraulic fluid pressure in the chambers 47 and 48 on the end surface of the back-pressure plunger 50 and on the valve plunger 49 respectively should be in a state of equilibrium. As the pointed end surface 61 of the back-pressure plunger 50 has a smaller area than the plane end surface of the valve plunger 49 facing the chamber 48, at the state of equilibrium the pressure in the chamber 48 must be lower than the pressure in the chamber 47. The pressure in the chamber 48 can be controlled by both the fixed throttle 59 and by the throttling which is effected by the tapered recess 57 in the valve needle 58 coacting with the bore 56. When the valve plunger 49 and the back-pressure plunger 50 are in a state of equilibrium, the valve needle 58 is to assume such a position in relation to the tapered recess 57 that the throttling thereby obtained, together with the fixed throttle 59, produces a pressure in the chamber 48 such that its influence on the larger end surface of the valve plunger 49 balances the influence of the pressure of the hydraulic fluid in the chamber 47 against the pointed end surface of the pressure plunger 50.

The valve needle 58 can be displaced under the influence of a pilot magnet not shown in FIG. 5. If the valve needle 58 should move in the direction away from the valve plunger 49, the throttle between the valve needle 58 and the recess 57 will open and the pressure in the chamber 48 will decrease by the outflow of fluid. Under the influence of the constant pressure in the chamber 47, the back-pressure plunger 50 and, under the influence of plunger 50, also the valve plunger 49, will be displaced in the direction towards the chamber 48. The recesses 51 and 52 will then be connected with the pipes 43 and 42 respectively, and in that way also the connections 36 and 38 will become connected to the hydraulic fluid pressure fed through the pipe 39. The continued movement of the valve needle in the direction away from the valve plunger 49 will thus, in other words, have the result that hydraulic fluid will be fed through the connections 36 and 38.

If, at the above-mentioned feeding of hydraulic fluid through the connections 36 and 38, one or more of the hydraulic cylinders should be under exceptionally high pressure, for instance owing to the vehicle resting on a base which subjects one of the end wheels to a particularly heavy load, the hydraulic fluid will automatically be fed only to the hydraulic cylinders in which there is lower pressure. By the action of the non-return valves 30, 35 and 44, a possible higher hydraulic pressure in any of the hydraulic cylinders will be prevented from being propagated to the other cylinder or to the part of the hydraulic system which is on the other side of the valve 37. Due to the above-mentioned circumstances, when feeding hydraulic fluid, the pressure of this can be limited to correspond to only the lowest pressure existing in the hydraulic cylinders, and this, naturally, involves considerable savings in regard to the dimensioning of the hydraulic system.

If the valve needle 58 in the valve 37 is moved in the direction towards the valve plunger 49 (see FIG. 5), the throttling between the valve needle 58 and the recess 57 will increase, and the oil pressure in the chamber 48 will increase. This has the result that the valve plunger 49 and the back-pressure plunger 50 will be displaced in the direction towards the chamber 47. This results in a connection between the recess 51 and the pipe 55, whereby the connection 36 will be connected to the outlet side of the hydraulic system, via the pipe 40. The last-mentioned displacement of the valve needle 58 in the direction towards the valve plunger 49 will, in other words, have the result that hydraulic fluid is conducted off through the connection 36. On the other hand, it is not possible to drain any of the hydraulic fluid through the connection 38, but through the influence of the pumps 29 and 34, hydraulic fluid can be conducted off also from the hydraulic cylinders 13 and 22, indirectly via the connection 36.

The above-mentioned regulating of the pumps 29 and 34 and the valve 37 can appropriately be accomplished electrically. Impulses for the control of these units are then obtained from synchros, one of which can be actuated by an aiming unit for setting the elevation of the gun barrel, and four other synchros sense the position of the arms 9 on the end road wheels. For the sake of simplicity, however, these regulating devices and the connections between them have not been described in the present patent, but an appropriate arrangement is described in the United States Patent No. 3,183,016 of the assignee herein.

What is claimed is:
1. An adjustable wheel suspension device for adjusting the position of the front and rear wheels of a track-laying vehicle in reference to the vehicle body, said suspension device comprising in combination:
    a pair of front wheels and a pair of rear wheels;
    a suspension means for each of said wheels, each of said suspension means pivotally supporting the respective wheel on the vehicle body to vary the position thereof in reference to the vehicle body;
    a hydraulic servo-unit for each wheel, each of said units being coupled with the respective suspension means to control the pivotal position thereof by the setting of fluid pressure in the respective servo-unit;
    a hydraulic pressure storage means for each servo-unit connected with the respective unit;
    first pressure fluid conduits connecting the servo-unit at each front wheel with the servo-unit at the corresponding rear wheel;
    a reversible variable pump included in each of said first conduits to pump pressure fluid from the servo-unit at each front wheel to the servo-unit at the respective rear wheel and vice-versa thereby correspondingly varying the pivotal positions of the respective suspension means;
    second pressure fluid conduits directly interconnecting the servo-units at the two front wheels to equalize fluid pressure between the front wheel servo-units;
    third pressure fluid conduits connecting the servo-units at the rear wheels with each other;
    a pair of oppositely directed one-way valves included in said third conduits, each of said valves permitting flow of pressure fluid into one of the servo-units at the rear wheels;
    valve means having an inlet for feeding pressure fluid into the valve means and an outlet for discharging pressure fluid from the same, said valve means being connected by a first pipe to the second conduits and by a second pipe to the third conduits; and
    valve control means for controlling said valve means, said control means being settable so that selectively either one of said pipes is open for the feed of fluid via the valve means to said conduits or both pipes are closed, or that the first pipe is open for the discharge of fluid through the outlet of the valve means.

2. A suspension device according to claim 1 wherein said valve means comprises a valve housing including a valve chamber connected to said fluid inlet, said fluid outlet, and said first and second pipes, and a plunger slidable in said chamber, said plunger in a neutral position closing the fluid inlet, in one active position connecting the fluid inlet with the first and second pipe and in another active position connecting the first pipe and the fluid outlet, and wherein said control means co-act with said plunger to place the same in the selected one of said plunger positions.

3. A suspension device according to claim 2 wherein said plunger has three lengthwise spaced collars, the peripheral outline of said collars fitting the peripheral outline of said chamber and the plunger portions between the collars having a smaller peripheral outline than the chamber, the intermediate collar controlling the opening and closing of the fluid inlet and of the fluid outlet of the valve means, one of the outer collars the opening and closing of the first pipe and the other of the outer collars opening and closing of the second pipe.

4. A suspension device according to claim 3 wherein said fluid inlet of the valve means has a first branch connecting with a chamber at a point controlled by the position of the intermediate collar and a second branch controlled by said one outer collar, and wherein said second branch includes a one-way valve preventing the out-flow of fluid from the chamber through said second branch.

5. A suspension device according to claim 2 wherein said control means comprises extensions of the chamber defining two compartments each adjacent to the outer face of one outer collar, conduits connecting each of said compartments directly with the fluid inlet of the valve means to provide in the compartments a corresponding fluid pressure acting upon the plunger to urge the same into a position of equilibrium in the chamber, said position being the neutral position of the plunger, and actuating means for varying the effective pressure in said compartments to move the plunger into a selected one of said active positions.

6. A suspension device according to claim 5 wherein said actuating means comprises means for selectively varying the effective face areas of the plungers exposed to the fluid pressure in said compartments.

7. A suspension device according to claim 5 wherein the outer face of one of the outer plunger collars includes a recess of diminishing cross-sectional area toward its base, and a piston is slidable in the one compartment bounded by said recessed collar face, the side of the piston facing the recess having a configuration matching the recess and being engageable with the same, said plunger including a lengthwise bore connecting said compartments for the flow of fluid between said compartments, and wherein an adjustable valve is provided in the other compartment to control the flow of fluid through said bore thereby varying the pressure in the two compartments in reference to each other.

8. A suspension device according to claim 7 wherein said valve is a needle valve having a valve needle controlling the free flow opening through said bore by its position in reference to said opening.

9. A suspension device according to claim 1 wherein each of said first conduits includes a safety valve for discharging fluid from the first conduits in response to a fluid pressure in the first conduits above a predetermined value.

References Cited
UNITED STATES PATENTS

| | | | |
|---|---|---|---|
| 3,063,510 | 11/1962 | Hunger | 180—9.2 |
| 3,082,043 | 3/1963 | Orton | 180—9.2 X |
| 3,183,016 | 5/1965 | Gustafsson | 280—6.1 |
| 3,246,405 | 4/1966 | Reynolds | 180—9.52 X |
| 3,254,738 | 6/1966 | Larsen | 180—9.2 |
| 3,262,522 | 7/1966 | Johnson | 180—9.2 X |

LEO FRIAGLIA, *Primary Examiner.*

RICHARD J. JOHNSON, *Assistant Examiner.*